US012308548B2

(12) United States Patent
Fan et al.

(10) Patent No.: US 12,308,548 B2
(45) Date of Patent: May 20, 2025

(54) TERMINAL AND CONNECTOR

(71) Applicant: Tyco Electronics (Shanghai) Co., Ltd., Shanghai (CN)

(72) Inventors: Dingbing (Frank) Fan, Shanghai (CN); Ming Shi, Shanghai (CN); Lei (Louis) Liu, Shanghai (CN); Xiaozhi (George) Fu, Shanghai (CN); Wei Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 408 days.

(21) Appl. No.: 17/824,223

(22) Filed: May 25, 2022

(65) Prior Publication Data

US 2022/0384972 A1 Dec. 1, 2022

(30) Foreign Application Priority Data

May 25, 2021 (CN) ........................ 202121127578.5

(51) Int. Cl.
*H01R 13/11* (2006.01)
*H01R 4/18* (2006.01)
*H01R 13/432* (2006.01)

(52) U.S. Cl.
CPC .............. *H01R 13/11* (2013.01); *H01R 4/185* (2013.01); *H01R 13/432* (2013.01)

(58) Field of Classification Search
CPC ....... H01R 4/185; H01R 13/11; H01R 13/432
USPC .......................................................... 439/26
See application file for complete search history.

(56) References Cited

U.S. PATENT DOCUMENTS

| | | | | |
|---|---|---|---|---|
| 5,112,254 A * | 5/1992 | Endo | H01R 43/16 | 439/852 |
| 5,897,405 A * | 4/1999 | Endo | H01R 13/11 | 439/852 |
| 6,379,199 B1 * | 4/2002 | Chen | H01R 13/11 | 439/852 |
| 9,595,770 B2 * | 3/2017 | Nagasaki | H01R 4/185 | |
| 2001/0009817 A1 * | 7/2001 | Oda | H01R 13/6315 | 439/246 |
| 2014/0141662 A1 * | 5/2014 | Kutsuna | H01R 13/521 | 439/888 |
| 2015/0222038 A1 * | 8/2015 | Volpone | H01R 13/115 | 439/842 |
| 2015/0263456 A1 * | 9/2015 | Hashimoto | H01R 13/642 | 439/752.5 |

(Continued)

FOREIGN PATENT DOCUMENTS

| | | | |
|---|---|---|---|
| FR | 2673490 A1 * | 9/1992 | H01R 43/16 |
| FR | 2699010 A1 * | 6/1994 | H01R 13/113 |

(Continued)

OTHER PUBLICATIONS

Extended European Search Report dated Oct. 26, 2022, corresponding to Application No. 22175187.8-1201, 9 pages.

*Primary Examiner* — Peter G Leigh
(74) *Attorney, Agent, or Firm* — Barley Snyder

(57) ABSTRACT

A terminal includes a top wall, a side wall, and a curved part connected between the top wall and the side wall. A notch is formed on the curved part. The notch reduces a bending force for forming the curved part and prevent cracks from being generated in the curved part during forming the curved part.

21 Claims, 2 Drawing Sheets

(56) References Cited

U.S. PATENT DOCUMENTS

| | | | | |
|---|---|---|---|---|
| 2015/0280330 | A1* | 10/2015 | Oka | H01R 13/08 439/878 |
| 2015/0280341 | A1* | 10/2015 | Kutsuna | H01R 13/113 439/816 |
| 2016/0268718 | A1* | 9/2016 | Nagasaki | H01R 13/428 |
| 2020/0203869 | A1* | 6/2020 | Tsuchiya | H01R 13/114 |
| 2021/0104841 | A1* | 4/2021 | Takeuchi | H01R 13/4223 |

FOREIGN PATENT DOCUMENTS

| | | | | | |
|---|---|---|---|---|---|
| FR | 2721758 | A1 | * | 12/1995 | H01R 13/114 |
| JP | 2007066525 | A | * | 3/2007 | |
| JP | 4413836 | B2 | * | 2/2010 | |
| JP | 4908155 | B2 | * | 4/2012 | |
| JP | 2014110214 | A | * | 6/2014 | H01R 13/11 |

* cited by examiner

TERMINAL AND CONNECTOR

CROSS-REFERENCE TO RELATED APPLICATION

This application claims the benefit of the filing date under 35 U.S.C. § 119(a)-(d) of Chinese Patent Application No. 202121127578.5, filed on May 25, 2021.

FIELD OF THE INVENTION

The present invention relates to a terminal and a connector including the terminal.

BACKGROUND

For a stamping terminal with a top wall and a side wall, the side wall needs to be bent by a predetermined angle relative to the top wall. In the prior art, no notch is formed on the curved part between the top wall and the side wall, which leads to the large bending force required for forming the curved part, and the bending of the curved part is very difficult. In addition, cracks easily occur on the curved part during forming the curved part, which reduces the quality of terminal and the reliability of electrical connection.

SUMMARY

A terminal includes a top wall, a side wall, and a curved part connected between the top wall and the side wall. A notch is formed on the curved part. The notch reduces a bending force for forming the curved part and prevent cracks from being generated in the curved part during forming the curved part.

BRIEF DESCRIPTION OF THE DRAWINGS

The invention will now be described by way of example with reference to the accompanying Figures, of which.

DETAILED DESCRIPTION OF THE EMBODIMENTS

Figure 1:
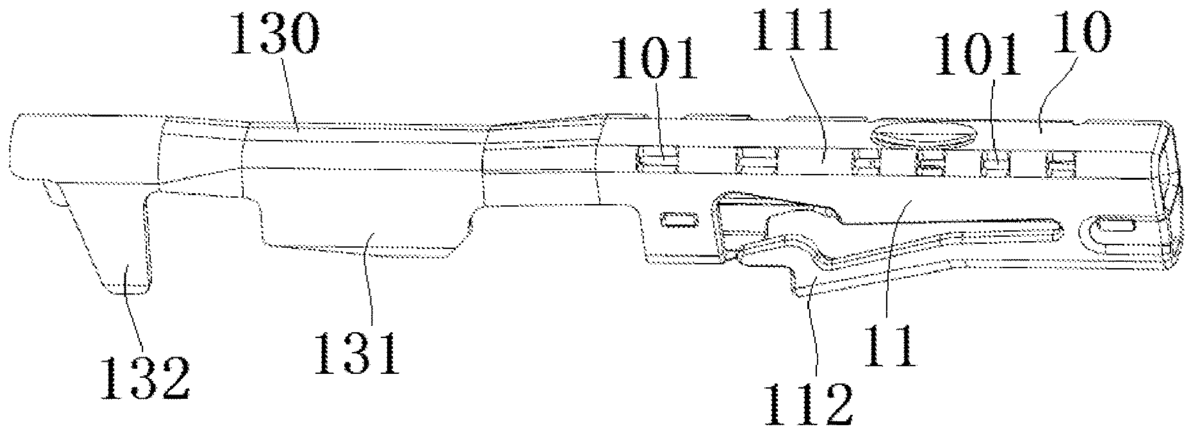
FIG. 1 is a perspective view of a terminal according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown to simplify the drawing.

Figure 2:
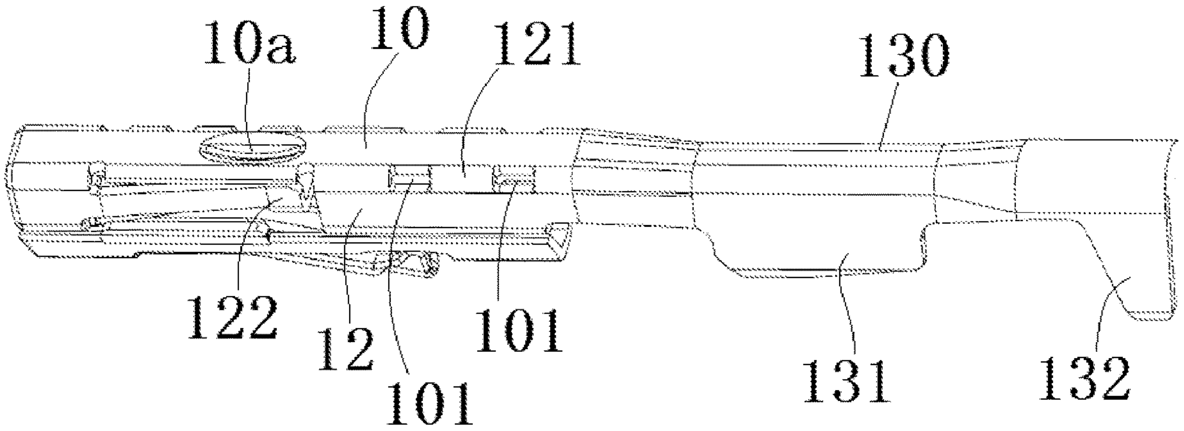
FIG. 2 is another perspective view of the terminal of FIG. 1.

As shown in FIGS. 1 and 2, in the illustrated embodiment, the terminal mainly includes a top wall 10, a side wall 11 and 12 and a curved part 111 and 121. The curved part 111 and 121 is connected between the top wall 10 and the side wall 11 and 12. At least one notch 101 is formed on the curved part 111 and 121 to reduce the bending force required for forming the curved part 111 and 121 and to prevent cracks from being generated in the curved part 111 and 121 during forming the curved part 111 and 121. Therefore, the present invention can reduce the manufacturing difficulty of the terminal and improve the manufacturing quality of the terminal.

In the embodiment shown in FIGS. 1 and 2, a plurality of notches 101 are formed on the curved part 111 and 121, the notches 101 are separated from each other and extend along the length direction of the terminal respectively. In the shown embodiment, a plurality of notches 101 are formed on the first curved part 111 and the second curved part 121 respectively.

As shown in FIGS. 1 and 2, in an exemplary embodiment of the present invention, the sum of the extension lengths of the plurality of notches 101 along the length direction is not less than one fourth of the extension length of the curved part 111 and 121 along the length direction, and is not greater than three quarters of the extension length of the curved part 111 and 121 along the length direction. The present invention is not limited to this embodiment, and the sum of the extension lengths of the plurality of notches 101 can be appropriately adjusted according to the actual needs. The extension lengths of the plurality of notches 101 on the curved part 111 and 121 may be the same or different from each other.

As shown in FIGS. 1 and 2, the side wall 11 and 12 of the terminal include a first side wall 11 and a second side wall 12 located on both sides of the width direction of the top wall 10, respectively. The curved part 111 and 121 includes a first curved part 111 connected between the top wall 10 and the first side wall 11 and a second curved part 121 connected between the top wall 10 and the second side wall 12. However, the present invention is not limited to the shown embodiment. For example, in another exemplary embodiment of the present invention, the terminal may include a single side wall.

Figure 3:
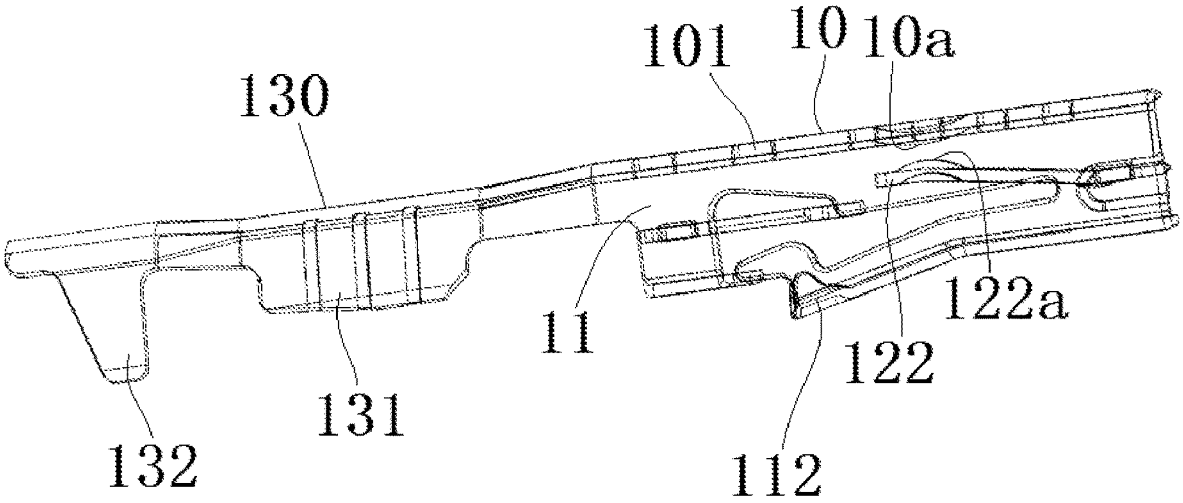
FIG. 3 is a sectional perspective view of the terminal of FIG. 1.

As shown in FIGS. 1 to 3, in the illustrated embodiment, the terminal also includes an elastic latch 112 connected to the first side wall 11. The elastic latch 112 is adapted to be locked to a housing of a connector, to lock the terminal in the housing.

In the embodiment shown in FIGS. 1 to 3, the terminal also includes an elastic arm 122 connected to the second side wall 12 and facing the top wall 10. The elastic arm 122 is adapted to electrically contact a mating terminal inserted between the elastic arm 122 and the top wall 10.

As shown in FIG. 3, in the illustrated embodiment, a first electrical contact **10*a* projecting towards the elastic arm 122 is formed on the top wall 10, and a second electrical contact 122*a* projecting towards the first electrical contact 10*a* is formed on the elastic arm 122. The first electrical contact 10*a* and the second electrical contact 122*a* are suitable for simultaneous electrical contact with the upper and lower sides of the mating terminal inserted between the elastic arm 122 and the top wall 10**.

As shown in FIGS. 1 to 3, in the illustrated embodiment, the terminal also includes a wire connection part 130 connected to one end of the top wall 10 and the first and second side walls 11 and 12. In the illustrated embodiment, the wire connection part 130 includes a pair of first wings 131 and a pair of second wings 132. The pair of first wings 131 are adapted to be crimped on the conductor core of a wire. The pair of second wings 132 are adapted to be crimped on the outer layer of the conductor.

In the shown embodiment, the terminal is an integrated terminal made by stamping a single terminal material plate. In this way, the manufacturing cost of the terminal can be reduced.

Figure 4:
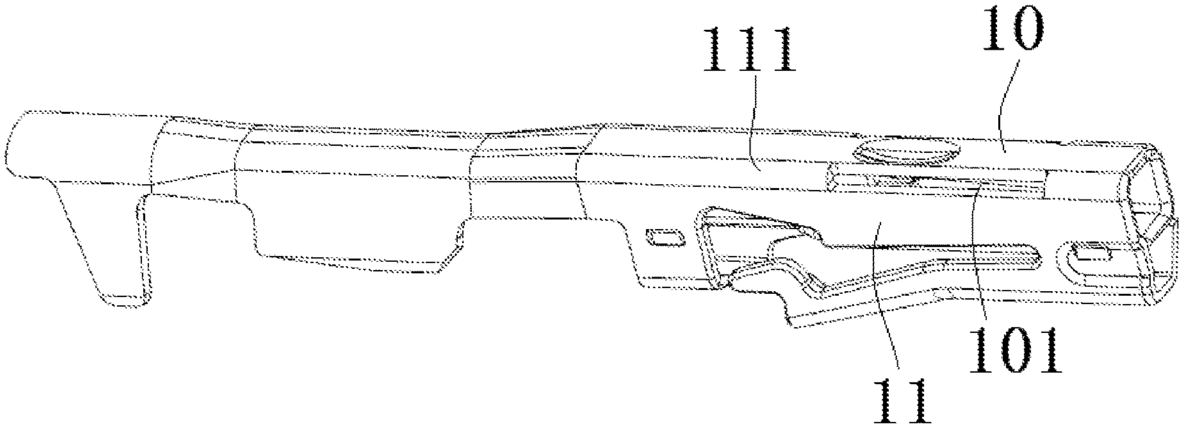
FIG. 4 is a perspective view of a terminal according to another embodiment.

A terminal according to another embodiment is shown in FIG. 4. The main difference between the embodiment of the terminal shown in FIG. 4 and the embodiment of the terminal shown in FIGS. 1-3 is that the number and extension length of the notch formed on the curved part are different.

As shown in FIG. 4, a single notch 101 is formed on either of the first curved part 111 and the second curved part 121. The single notch 101 extends a predetermined length along the length direction of the terminal. In the illustrated embodiment, the extension length of the single notch 101 along the length direction of the terminal is not less than one quarter of the extension length of the curved part 111 and 121 along the length direction of the terminal, and not more than three quarters of the extension length of the curved part 111 along the length direction of the terminal.

Note that the present invention is not limited to the embodiments shown in FIGS. 1 to 4. For example, in another exemplary embodiment of the present invention, a plurality of notches 101 may be formed on one of the first curved part 111 and the second curved part 121, and a single notch 101 may be formed on the other of the first curved part 111 and the second curved part 121.

Although not shown, in another exemplary embodiment of the present invention, a connector is also disclosed, which includes a housing and the aforementioned terminal, and the terminal is installed in the housing for mating with the mating terminal of a mating connector.

Note that the notch 101 in the present invention has been formed on the curved part 111 and 121 before bending the curved part 111 and 121, and the notch 101 is only located on the curved part 111 and 121 and does not extend to the top wall 10 and side walls 11 and 12, which is different from the opening formed on the side wall or top wall of the terminal.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal, comprising:

a top wall;

a side wall; and a curved part connected between the top wall and the side wall, a notch is formed on the curved part, and the notch is only located on the curved part.

2. The terminal of claim 1, wherein the notch reduces a bending force for forming the curved part and prevent cracks from being generated in the curved part during forming the curved part.

3. The terminal of claim 1, wherein the notch is one of a plurality of notches in the curved part, the notches are spaced from each other and extend along a length direction of the terminal.

4. The terminal of claim 3, wherein a sum of a plurality of extension lengths of the notches along the length direction is greater than or equal to one-fourth of an extension length of the curved part along the length direction.

5. The terminal of claim 4, wherein the sum of the plurality of extension lengths of the notches along the length direction is less than or equal to three-quarters of the extension length of the curved part along the length direction.

6. The terminal of claim 4, wherein the extension lengths of the notches are the same as one another.

7. The terminal of claim 4, wherein the extension lengths of the notches are different from one another.

8. The terminal of claim 1, wherein the notch is the only notch on the curved part.

9. The terminal of claim 8, wherein an extension length of the notch along a length direction of the terminal is greater than or equal to one-fourth of an extension length of the curved part along the length direction.

10. The terminal of claim 9, wherein the extension length of the notch along the length direction is less than or equal to three-quarters of the extension length of the curved part along the length direction.

11. The terminal of claim 1, wherein the side wall includes a first side wall and a second side wall at opposite sides of the top wall in a width direction, the curved part has a first curved part connected between the top wall and the first side wall and a second curved part connected between the top wall and the second side wall.

12. The terminal of claim 11, wherein the notch is one of a plurality of notches formed on at least one of the first curved part and the second curved part.

13. The terminal of claim 11, wherein the notch is a single notch formed on each of the first curved part and the second curved part.

14. The terminal of claim 11, further comprising an elastic latch connected to the first side wall configured to be locked to a housing of a connector.

15. The terminal of claim 11, further comprising an elastic arm connected to the second side wall and facing the top wall, the elastic arm electrically contacts a mating terminal inserted between the elastic arm and the top wall.

16. The terminal of claim 15, wherein the top wall has a first electrical contact projecting toward the elastic arm.

17. The terminal of claim 16, wherein the elastic arm has a second electrical contact projecting toward the first electrical contact, the first electrical contact and the second electrical contact simultaneously contact an upper side and a lower side of the mating terminal.

18. The terminal of claim 1, further comprising a wire connection part connected to the top wall and the side wall.

19. The terminal of claim 18, wherein the wire connection part has a pair of first wings crimped on a conductor core of a wire and a pair of second wings crimped on an outer layer of the wire.

20. The terminal of claim 1, wherein the terminal is formed by stamping a single terminal material plate.

21. A connector, comprising:
- a housing; and
- a terminal disposed in the housing, the terminal including a top wall, a side wall, and a curved part connected between the top wall and the side wall, a notch is formed on the curved part, and the notch is only located on the curved part.

* * * * *